July 6, 1965     G. R. TORCHIA     3,192,650
EDUCATIONAL DEVICE
Filed Dec. 19, 1962
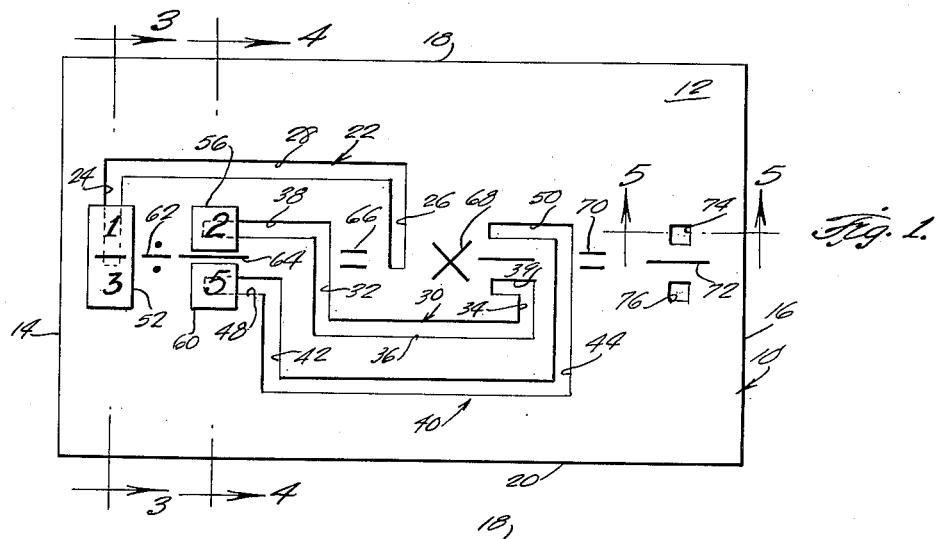
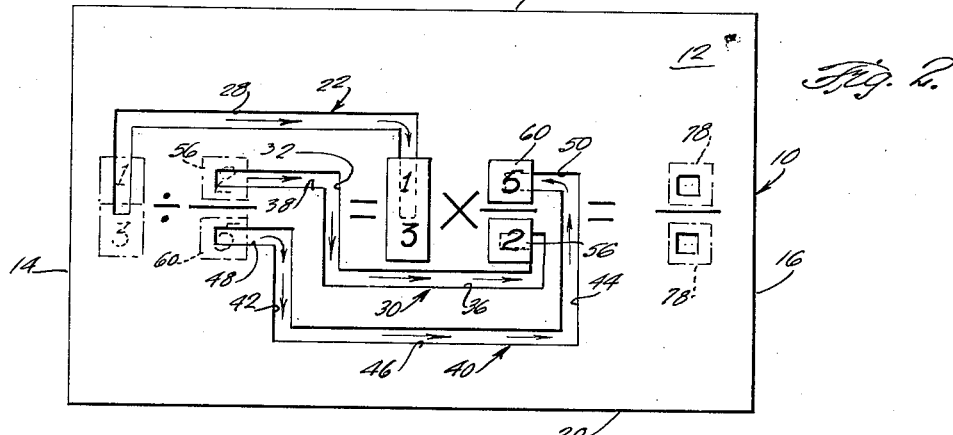
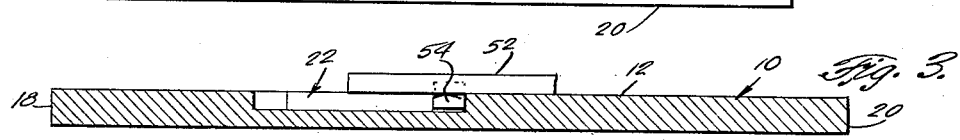
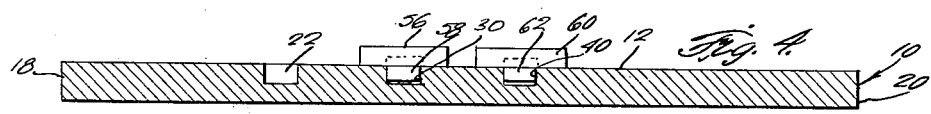
INVENTOR.
GILDO RALPH TORCHIA
BY
Victor J. Evans & Co.
ATTORNEYS 3,192,650
EDUCATIONAL DEVICE
Gildo R. Torchia, 454½ Center St., Johnsonburg, Pa.
Filed Dec. 19, 1962, Ser. No. 245,788
2 Claims. (Cl. 35—31)

The present invention relates to educational devices generally and in particular to a device for teaching fractions.

An object of the present invention is to provide a visual device for teaching of fractions to children or others who have difficulty in remembering the relation between the dividend and the divisor when dividing fractions.

Another object of the present invention is to provide an educational device which is interesting to use, one simple in structure, one which may be manufactured in quantity at reasonable cost, and one which employs the principle of teaching by using so that the individual being taught remembers what he has seen and what he has used.

A further object of the present invention is to provide an educational device which may be adapted for other purposes than division of fractions, one which is simple in structure, and one which is highly effective in action.

These and other objects and advantages of the present invention will be understood from the following description when considered in connection with the annexed drawings, in which:

FIGURE 1 is a plan view of the device of the present invention with the game pieces thereon shown at the beginning of a problem, FIGURE 2 is another plan view showing the game pieces at the solution of a problem.

FIGURE 3 is a view taken on the line 3—3 of FIGURE 1 and on an enlarged scale,

FIGURE 4 is a view taken on the line 4—4 of FIGURE 1 and on an enlarged scale,

FIGURE 5 is a view taken on the line 5—5 of FIGURE 1 and on an enlarged scale,

FIGURE 6 is a perspective view of one of the game pieces shown in FIGURES 1 and 2, and FIGURE 7 is a perspective view of another one of the game pieces shown in FIGURES 1 and 2.

Referring in detail to the drawing, the device of the present invention comprises a board 10 having an upper surface 12, end edges 14 and 16 and spaced side edges 18 and 20 connecting the ends of the end edges 14 and 16 together.

The upper surface 12 of the board 10 is provided with a first groove 22 in the form of an inverted U as it appears in FIGURES 1 and 2. The groove 22 has leg portions 24 and 26 and a bight 28 connecting the leg portions 24 and 26 together.

Also on the upper surface 12 is a second groove 30 having legs 32 and 34 and a bight 36 connecting adjacent ends of the legs 32 and 34 together. An extension 38 projects at right angles from the leg 32 on the free end of the latter, and another extension 39 projects from the leg 34.

The board 10 is provided with a third groove 40, also of U-shape having legs 42 and 44 and a bight 46 connecting the adjacent ends of the legs 42 and 44 together. The short extension 48 projects from the free end of the leg 42 and terminates adjacent the free end of the leg extension 38 of the groove 30. The legs 32 and 42 of the grooves 30 and 40, respectively, are between the legs or leg portions 24 and 26 of the groove 22 while the legs 34 and 44 are exteriorly of the leg portion 26 of the groove 22. An extension 50 projects inwardly from the free end of the leg 44, such extension being of a length so as to terminate at a point directly over the free end of the leg 34 of the groove 30.

A first game piece 52 is provided and bears indicia representing a fraction, for example one-third of a unit. The game piece 52 is shown inverted in FIGURE 6 and is seen to have on its lower face a projection 54 conformably shaped to fit within the groove 22.

Another game piece 56, half the size of the game piece 52 is also provided on its under face with a projection 58 for sliding movement of the game piece in the groove 30.

A third and final game piece 60 is provided on its under face with a projection 62 for sliding movement in the groove 40. The game pieces 56 and 60 are identical and one is shown in FIGURE 7 in inverted position.

Whole number indicia is on the upper face of the game piece 56 and also on the upper face of the game piece 60, and other game pieces besides the game pieces 52, 56, and 60, may be provided with other indicia thereon to present other fraction problems as desired.

The upper face of the board 10 provides indicia representing arithmetical equation symbols as indicated by the reference numerals 62, 66, 68, 70, and 72 in FIGURE 1. Additionally, the upper surface of the board is provided with two square holes 74 and 76 which are of a size to receive the projections of other game pieces as indicated in dotted lines in FIGURE 2 at 78.

In use, the board 10 is provided with game pieces having the required indicia thereon for working out a particular problem. The individual being taught can see that when the game piece 56 is slidably moved along the groove 30 to the final position shown in FIGURE 2 and the game piece 60 is similarly moved along the groove 40 to its final position, the game pieces 56 and 60 are in an inverted position relative to each other when they are in the final position as against their starting position in FIGURE 1.

This, plus the indicia inscribed on the board 10, teaches the child or individual being taught that the division of fractions is the same as multiplying of fractions when the divisor is inverted.

Other uses for the board are contemplated and the particular shape of the grooves herein may be altered to suit the problems as desired.

While only a preferred embodiment of the invention is shown and described, it is contemplated that numerous changes and modifications may be made in the invention without departing from the spirit thereof as set forth in the appended claims.

What is claimed is:
1. In an educational device including a board having an upper surface, there being a first groove in said board upper surface, said groove having spaced leg portions and a bight portion connecting one of the adjacent ends of said leg portions together, said board upper surface being provided with a second and a third groove each of U-shaped configuration, said second groove being partially within and spaced from said third groove, one of the adjacent legs of said second and third grooves being between the leg portions of said first groove with the free end of said second groove one leg between the free end of said third groove one leg and said bight of said first groove, the other adjacent legs of said second and third grooves being exteriorly of and spaced from one of the leg portions of said first groove with the free end of said third groove other leg between the free end of said second groove other leg and one side edge of said board in inverted relation to the free end of one of the adjacent legs of the first groove, an extension on the free end of said second groove one leg, other extensions on each of the free ends of said third groove one and other legs, a first game piece slidably mounted in said first groove from a starting position adjacent the free end of the other of the leg portions of said first groove to a final position adjacent the free end of said first groove one leg portion, a second game piece slidably mounted in said second groove from a starting position at one end of said second groove one leg extension to a final position adjacent the free end of said second groove other leg, and a third game piece slidably mounted in said third groove from a starting position at one end of said third groove one leg extension to a final position adjacent one end of said third groove other leg extension whereby the position of the first and second game pieces will be inverted to occupy positions directly above and directly below one another when moved from starting to final positions, there being numerical indicia on said first, second, and third game pieces and indicia on said board upper surface representing mathematical equations relating to the numerical indicia of said game pieces when in said starting and final positions, the indicia on said first game piece representing a numerical fraction and the indicia on said second and third game pieces representing numerical parts of a fraction.

2. In an educational device including a board having an upper surface, a first end edge, a second end edge, and spaced side edges connecting the ends of said first and second end edges together, there being a first groove in said board upper surface, said groove having spaced leg portions parallel to said board end edges and a bight portion parallel to and adjacent one of said side edges and connecting one of the adjacent ends of said leg portions together, said board upper surface being provided with a second and a third groove each of U-shaped configuration, said second groove being partially within and spaced from said third groove, one of the adjacent legs of said second and third grooves being between the leg portions of said first groove with the free end of said second groove one leg between the free end of said third groove one leg and said bight of said first groove, the other adjacent legs of said second and third grooves being exteriorly of and spaced from one of the leg portions of said first groove with the free end of said third groove other leg between the free end of said second groove other leg and one side edge of said board, an extension on the free end of said second groove one leg, other extensions on each of the free ends of said third groove one and other legs, a first game piece slidably mounted in said first groove from a starting position adjacent the free end of the other of the leg portions of said first groove to a final position adjacent the free end of said first groove one leg portion, a second game piece slidably mounted in said second groove from a starting position adjacent the free end of said second groove one leg to a final position adjacent the free end of said second groove other leg, and a third game piece slidably mounted in said third groove from a starting position adjacent the free end of said third groove one leg to a final position adjacent the free end of said third groove other leg extension whereby the position of the second and third game pieces will be inverted to occupy positions directly above and directly below one another when moved from starting to final positions, there being numerical indicia on said first, second, and third game pieces and indicia on said board upper surface representing mathematical equations relating to the numerical indicia of said game pieces when in said starting and final positions.

References Cited by the Examiner
UNITED STATES PATENTS

| | | | |
|---|---|---|---|
| 310,325 | 1/85 | Shannon | 35—70 |
| 602,954 | 4/98 | Osborne | 35—75 |
| 795,487 | 7/05 | Courtney | 273—132 |
| 1,085,050 | 7/14 | Lathrop | 273—132 |
| 1,248,286 | 11/17 | Dixon | 35—75 |
| 1,483,916 | 2/24 | Troidl | 35—75 |
| 2,482,227 | 9/49 | Towne | 35—35.8 |

JEROME SCHNALL, *Primary Examiner.*

LAWRENCE CHARLES, *Examiner.*